United States Patent
Takayama

[19]

[11] Patent Number: 6,119,024
[45] Date of Patent: Sep. 12, 2000

[54] MOBILE RADIO SYSTEM

[75] Inventor: Yoshikazu Takayama, Tokyo, Japan

[73] Assignee: NEC Corporation, Tokyo, Japan

[21] Appl. No.: 09/122,769

[22] Filed: Jul. 27, 1998

[30] Foreign Application Priority Data

Jul. 25, 1997 [JP] Japan .................................. 9-199817

[51] Int. Cl.[7] .............................. H04B 1/38; H04B 1/16; H04B 7/00; H04Q 7/18; H04Q 7/22

[52] U.S. Cl. .................. 455/574; 455/343; 455/38.3; 455/456; 455/458; 455/38.2; 455/54.1; 370/311

[58] Field of Search ..................... 455/38.3, 343, 455/422, 458, 517, 455, 462, 464, 514, 524, 516, 574, 456; 370/311

[56] References Cited

U.S. PATENT DOCUMENTS

| | | | |
|---|---|---|---|
| 4,745,408 | 5/1988 | Nagata et al. | 340/825.48 |
| 5,237,603 | 8/1993 | Yamagata et al. | 379/61 |
| 5,448,774 | 9/1995 | Yokozaki et al. | 455/343 |
| 5,475,877 | 12/1995 | Adachi | 455/343 |
| 5,590,396 | 12/1996 | Henry | 455/33.1 |
| 5,765,104 | 6/1998 | Kushita | 455/343 |
| 5,815,819 | 9/1998 | Ohta et al. | 455/574 |
| 5,857,146 | 1/1999 | Kido | 455/38.3 |
| 5,862,487 | 1/1999 | Fujii et al. | 455/454 |
| 5,930,706 | 7/1999 | Raith | 455/422 |
| 5,966,665 | 12/1999 | Taki | 455/550 |

*Primary Examiner*—Daniel S. Hunter
*Assistant Examiner*—Meless Zewdu
*Attorney, Agent, or Firm*—Foley & Lardner

[57] ABSTRACT

A mobile radio system provides an appropriate usage environment in accordance with how often a mobile station is used. The base station informs via a broadcast channel each of the mobile station of PCHs and corresponding intermittent reception intervals. The mobile station selects one of the PCHs having a user's desired intermittent reception interval, and reports the selected PCH to the base station. The base station pages the mobile station over the PCH reported by the mobile station.

10 Claims, 3 Drawing Sheets

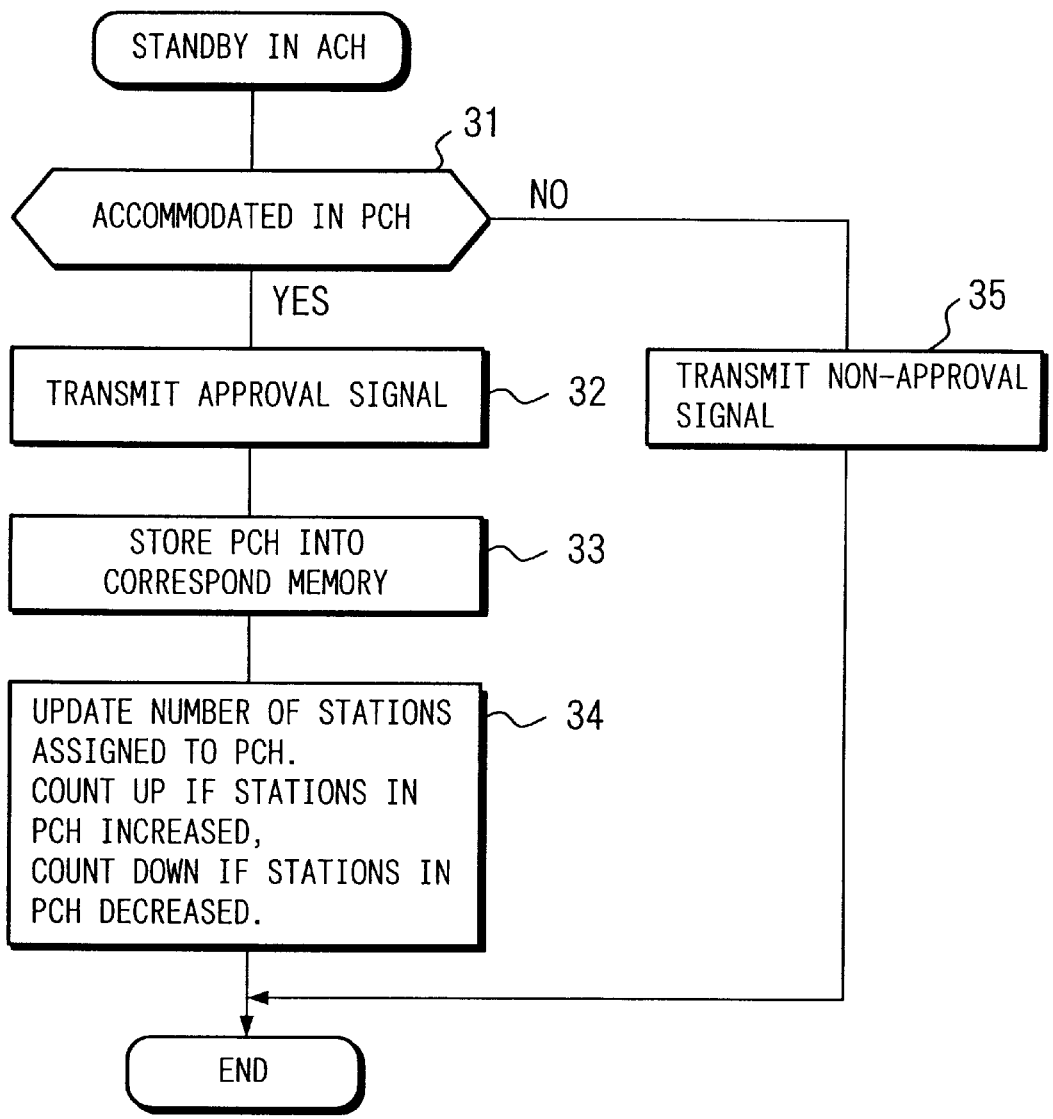

MOBILE RADIO SYSTEM

BACKGROUND OF THE INVENTION

1. Field of the Invention

The present invention relates to a mobile radio system, and more particularly, to a mobile radio system where a mobile station is in a standby state for a call from a base station over a predetermined paging channel.

2. Description of the Related Art

With conventional mobile radio systems, a predetermined radio channel is assigned to a paging channel (hereinafter, referred to as PCH). The mobile stations intermittently receive the paging channel PCH for a paging message from the base station over the PCH, and carry out a predetermined signal processing.

In particular, with the conventional portable telephone system, air interface requirements STD-27 of RCR (Research & development Center for Radio systems) specifies that the system incorporates a plurality of PCHs. But each mobile station is assigned only one PCH.

For example, if the number of radio carrier frequencies Nc is 3, the number of groups assigned to one radio carrier frequency NP is 3, and the total number of groups Nc×NP is 9, there exist a total of 9 logical channels (PCH1 to PCH9).

Mobile stations are in a standby state in a PCH which is determined by the following equation.

{(two least significant digits of mobile station identification (hereinafter, referred to as MSI)) −1}÷9+1.

For example, a mobile station having a mobile station identification MSI=109 is assigned PCH9 as a paging channel and cannot be in a standby state on a channel other than PCH9.

It is to be noted that mobile stations of the portable telephone system are in a standby state most of the time, i.e., waiting for a call incoming.

Therefore, the mobile stations consume most of power in the standby state.

For prolonged battery life, the mobile stations are operated in an intermittent reception mode to reduce power consumption.

Long intervals between receptions can save the battery life significantly but it takes longer time before the mobile station can answer.

For example, if the mobile station monitors the PCH every 30 seconds, the mobile station may be in a standby state for a length of time ranging from 0 to 30 seconds and 15 seconds on average, depending on the timing at which the calling message is transmitted in the standby period of the mobile station.

If the mobile station receives the PCH every second, the mobile station needs to be in the standby state only for 0.5 seconds on average.

However, the mobile station consumes about 30 times more power in an intermittent reception mode of one-second intervals than in an intermittent reception mode of 30-second intervals.

The aforementioned conventional mobile radio system suffers from a problem that the whole system uses the same intermittent reception periods or intervals. Therefore, if the mobile stations are used frequently, a longer time for paging the mobile stations is needed. If the mobile stations are not used frequently, they consume more power.

The present invention is to solve the aforementioned drawbacks.

SUMMARY OF THE INVENTION

An object of the invention is to provide a mobile radio system which can provide the users with an appropriate usage environment in accordance with how frequently the mobile stations are used.

In order to achieve the aforementioned object, a mobile radio system according to the present invention is configured as follows:

The base station transmits and informs a mobile station of intermittent reception intervals assigned to corresponding PCHs, and sends a paging signal to the mobile station via the paging channel PCH that has been reported from the mobile station by way of a PCH reporting signal. The mobile station selects one of the PCHs having different intermittent reception intervals informed by the base station, and reports the selected PCH to the base station by way of a PCH reporting signal.

Therefore, an appropriate paging channel PCH of intermittent reception intervals is established as a standby PCH that connects between the mobile station and the base station. The mobile station then enters its standby state in the selected PCH. The mobile station receives the selected PCH at intermittent reception intervals assigned to the PCH.

When the base station receives a PCH reporting signal from a mobile station, the base station checks the total number of mobile stations that have been assigned the paging channel PCH reported by the mobile station, and determines whether an additional mobile station can be assigned the same PCH. The base station then informs the mobile station as to whether the reported PCH can be assigned to the mobile station. Then, the mobile station enters its standby state in terms of paging channel PCH with intermittent reception interval in response to the PCH to receive an appropriate PCH that can be accepted by the base station.

Therefore, the base station checks the total number of mobile stations that have been assigned the paging channel PCH reported by the mobile station, and determines whether an additional mobile station can be assigned the same PCH for paging signal transmission. If an additional mobile station can be accommodated in the paging PCH, then, the mobile station enters its standby state to receive a paging signal.

The mobile station selects, as a standby PCH, a PCH having an intermittent reception interval the closest to and less than a desired interval. The mobile station reports the selected standby PCH to the base station.

The mobile station selects, as a standby PCH, a PCH having an intermittent reception interval the closest to and more than a desired interval. The mobile station reports the selected standby PCH to the base station.

Therefore, the mobile station selects, as a paging channel, a PCH having an intermittent reception interval close to and less than a desired intermittent reception interval, or as a standby PCH a PCH having close to and more than the desired intermittent reception interval.

When the mobile station is powered on or moves from one radio zone to another, the mobile station reelects a standby PCH having a desired intermittent reception interval and reports the selected PCH to the base station. Thus, a standby PCH has a desired intermittent reception interval is selected, when the mobile station is powered on or moves from one radio zone to another.

The mobile station reelects a standby PCH having a desired intermittent reception interval by a predetermined operation, and reports a new standby PCH to the base station. This predetermined operation allows the user to reelect a standby PCH having a desired intermittent reception interval.

In response to a non-approval signal received from the base station, the mobile station selects, as a standby PCH, another paging channel PCH having an intermittent reception interval which is the next closest to the desired intermittent reception interval, and then reports the selected new PCH back to the base station.

Therefore, if the paging channel PCH reported to the base station is roved, the mobile station selects a new PCH and reports it to the base station, the new PCH being reported as a standby PCH and having an intermittent reception interval which is the next closest to the desired interval.

BRIEF DESCRIPTION OF THE DRAWINGS

FIG. 3 is a flowchart illustrating a PCH registering routine on the base station side.

DETAILED DESCRIPTION OF THE PREFERRED EMBODIMENTS

Figure 1:
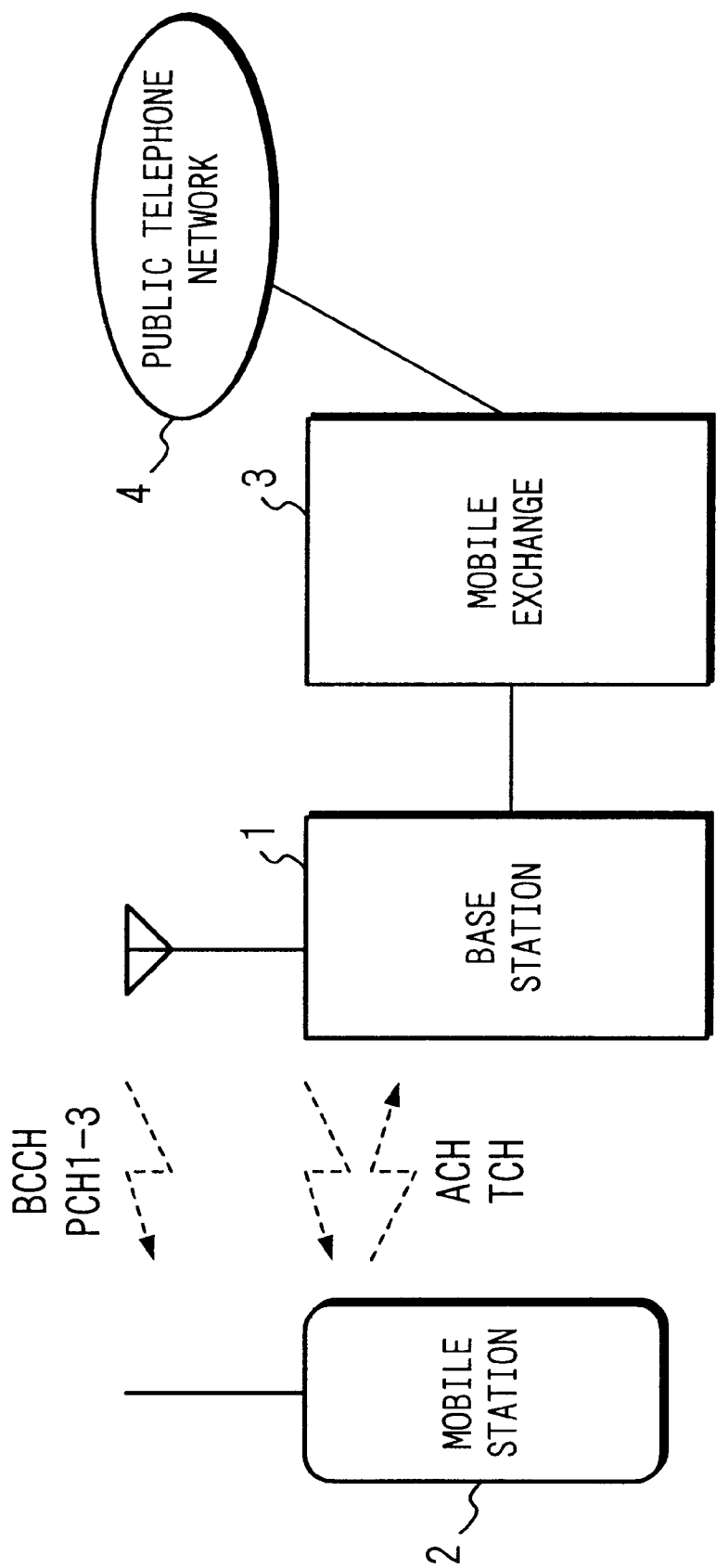
FIG. 1 is a block diagram of a mobile radio system according to an embodiment of the invention.

This above-mentioned and other objects, features and advantages of this invention will become more apparent by reference to the following detailed description of the invention taken in conjunction with the accompanying drawings, wherein:

FIG. 1 is a block diagram of a mobile radio system according to an embodiment of the present invention.

Referring to FIG. 1, a mobile station 2 is within the radio zone of a base station 1. There are a plurality of radio channels that connect between the base station 1 and the mobile station 2.

A mobile exchange 3 incorporates the base station 1 and is connected to a public telephone network 4.

The radio channels include an access channel ACH over which various items of control information are communicated between the base station 1 and the mobile station 2, and a traffic channel TCH over which the base station 1 and mobile station 2 can talk with each other.

Also, there are provided a broadcast channel BCCH over which the base station 1 broadcasts broadcast information to the mobile station 2, and a plurality of logic paging channels PCH over which the base station 1 pages the mobile station 2.

In the present invention, each PCH is assigned a corresponding unique intermittent reception interval and the base station 1 pages the respective mobile stations 2 according to the specific intermittent reception interval assigned to the respective PCHs. Each mobile station selects a PCH having an intermittent reception interval suitable for the usage environment of the mobile station 2, and reports the selected PCH to the base station 1. The, the mobile station 2 receives an approval from the base station 1 and enters its standby state in which the mobile station is paged at the intermittent reception interval assigned to that PCH.

The operation of the present invention will be described with reference to FIGS. 2 and 3.

Figure 2:
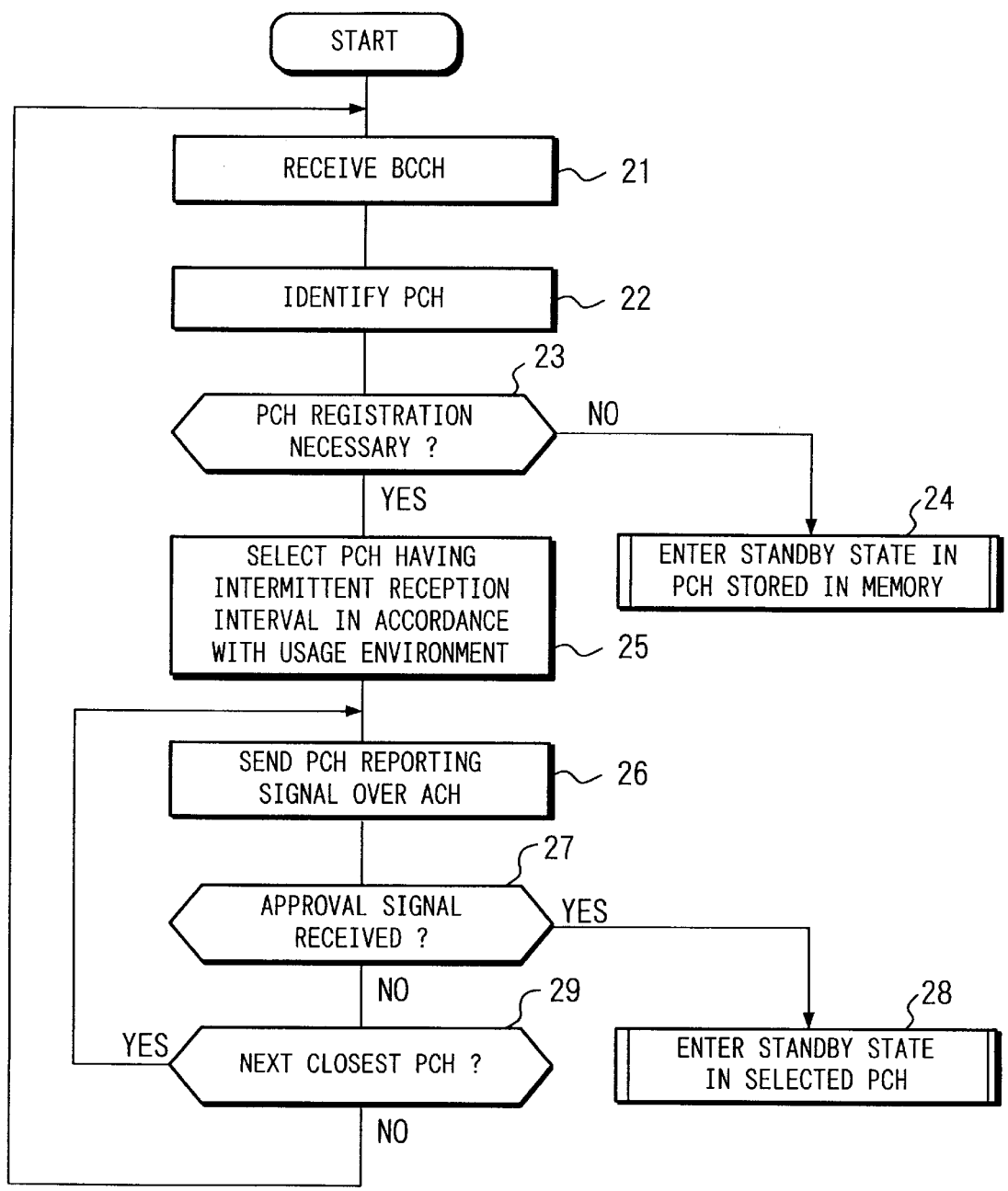
FIG. 2 is a flowchart illustrating a PCH setting routine performed on the mobile station side.

FIG. 2 is a flowchart illustrating a PCH setting routine performed on the mobile station side. FIG. 3 is a flowchart illustrating a PCH registering routine on the base station side.

The PCH setting routine will first be described with reference to FIG. 2.

Upon power up or when the mobile station 2 moves from one radio zone to another, the mobile station 2 carries out the PCH setting routine of FIG. 2.

The mobile station 2 first receives the broadcast channel to receive the broadcast information from the base station 1 (step 21).

In this case, the mobile station 2 is assigned a group of channels which are used for a radio link between the base station 1 and the mobile station 2. The mobile station 2 scans the group of channels to detect a broadcast channel to be received, and then receives it.

The base station 1 sends the broadcast information on all of the PCHs for the radio link, access channel, and the traffic channels at all times. The mobile station 2 receives the broadcast information, so that the mobile station 2 is informed of the locations of all the channels, intermittent reception intervals of the respective PCHs, and information on the paging area to which the base station 1 belongs (step 22).

The following description assumes that there are three PCHs, i.e., PCH1, PCH2, and PCH3, which are assigned intermittent reception intervals of 1 second, 5 seconds, and 30 seconds, respectively.

The PCHs and their assigned intermittent reception intervals may be sent to the mobile stations by way of broadcast information or may be fixedly assigned in advance according to the location of the PCHs.

Incidentally, paging area usually refers to a unit area where a paging routine is carried out for a radio zone covered by one or more base stations.

If the mobile station is in the same paging area, paging is effected using the same PCH regardless of which radio zone a mobile station is in.

The mobile station 2 determines whether a PCH should be registered or not, by comparing the location information that stored in the mobile station 2 with the location information received via the broadcast channel, the information indicating a paging area to which the base station 1 belongs (step 23).

If the two pieces of location information coincide with each other, it is determined that the mobile station 1 is in the same paging area as the paging area of the base station 1 and therefore the PCH need not be registered (step 23: NO), and the mobile station 2 enters a standby state using the PCH stored in the memory (step 24).

If the two pieces of location information do not coincide with each other, it is determined that the mobile station 2 has moved to another paging area and a new PCH needs to be registered (step 23: YES). From the PCHs informed of over the broadcast channel, the mobile station 2 selects an appropriate PCH having as close an intermittent reception interval to that stored in the memory of the mobile station as possible (step 25).

The selection of an appropriate PCH may be accomplished in such a way that PCHs are picked up from intermittent reception intervals smaller than that stored in the memory, in the order of being close to the intermittent reception interval stored in the memory.

For example, If the intermittent reception interval stored in the memory is 10 seconds, then PCH2 having an intermittent reception interval of 5 seconds is automatically selected, since 5 second interval is the closest to and less than 10 second interval.

Another way of selecting a PCH is to use a dial pad. The user inputs either a preferred PCH or an intermittent reception interval, so that either the preferred PCH or the PCH corresponding to the input intermittent reception interval is selected.

In the aforementioned manner, a predetermined PCH, for example, PCH2 is selected and then the mobile station 2 transmits a PCH reporting signal to the base station 1, reporting that the mobile station 2 enters a standby state in PCH2 (step 26).

Thereafter, the mobile station 2 receives an approval signal or a non-approval signal which is transmitted over the ACH from the base station 1 in response to the PCH reporting signal (step 27). If the mobile station receives an approval signal (step 27: YES), then the mobile station enters a standby state on the reported PCH, i.e., PCH2 in this example (step 28).

If the base station 1 returns non-approval signal (step 27: NO), then the mobile station 2 selects another PCH having an intermittent reception interval which is the next closest to the intermittent reception interval stored in the memory (step 29).

For example, if PCH2 having an intermittent reception interval of 5 seconds is found to be "non-approval," then PCH3 is automatically selected since PCH3 has an intermittent reception interval of 1 second which is shorter than and the second closest to the interval of 10 seconds.

If a PCH which is the second closest to the intermittent reception interval stored in the memory can be selected (step 29: YES), the program jumps back to step 26 where the mobile station 2 transmits a PCH reporting signal to the base station 1.

If an alternative PCH cannot be selected (step 29: NO), the program jumps back to step 21 where the mobile station 2 receives a broadcast channel of another radio zone.

Each radio zone is assigned a corresponding broadcast channel and the mobile station 2 can receive a broadcast channel of adjacent radio zones. In reality, the broadcast channels are received in the order of communication quality.

The PCH registering routine on the base station side will now be described with reference to FIG. 3.

When the base station 1 has received a PCH reporting signal from the mobile station 2 via the access channel ACH, the base station 1 carries out the PCH registering routine shown in FIG. 3.

A check is made to determine whether the base station can page the mobile station 2 over the PCH which was reported by way of the PCH reporting signal (step 31).

Each PCH has a maximum number of mobile stations that can be paged over that PCH, depending on the intermittent reception intervals. The longer the intermittent reception interval is, the more mobile stations can be paged.

Thus, if the base station 1 determines that no more mobile stations can be paged over the reported PCH (step 31: NO), then the base station 1 sends a non-approval signal to the mobile station 2 over the access channel ACH (step 35).

If the base station 1 determines that the reported PCH can accommodate another mobile station (step 31: YES), then the base station 1 sends an approval signal to the mobile station 2 over the access channel ACH (step 32).

Then, the base station 1 registers (step 33) the mobile station 2 as a mobile station which is in a standby state in the reported PCH, e.g., PCH2 and updates or increments by 1 the number of mobile stations accommodated in the reported PCH (step 34).

If the mobile station 2 has been registered as a station that is accommodated in another PCH, then the number of mobile stations accepted by that PCH is decreased by 1.

In the aforementioned manner, both base station 1 and mobile station 2 cooperates to determine a PCH that is suitable for the usage environment of the mobile station 2 and the mobile station 2 can enter a standby state.

In order that the base station 1 pages a mobile station 2 in response to the call incoming report from the mobile exchange, the base station 1 stores predetermined paging signals arranged in the order of being in standby state.

Thus, the paging signals are transmitted over the PCH at predetermined timings, so that the mobile stations 2 which are in the standby states on the PCH can receive the paging signal and a call incoming is indicated by means of ringing.

While the above-described PCH setting routine (see FIG. 2) is performed when the mobile station 2 is powered on or the mobile station 2 moves from one radio zone to another, the PCH setting routine may also be performed when the user inputs a new intermittent reception interval, thereby allowing the intermittent reception interval to be quickly changed as required.

If the user inputs a new intermittent reception interval by operating the key pad, the aforementioned step 23 is not required and the program may directly proceed from step 22 to step 24.

The PCH setting routine (FIG. 2) performed on the mobile station 2 side has been described with respect to a case where PCHs having intermittent reception intervals shorter than the intermittent reception interval stored in the mobile station 2 are selected at step 25 in the order of being close to the stored interval.

This way of selecting the PCH prevents the selection of a PCH having an intermittent reception interval longer than that of stored in the mobile station 2, allowing the user to set a PCH having an interval closest to the user's preference.

The way of selecting the PCH is not limited to the aforementioned method but, for example, PCHs having intermittent reception interval longer than and closest to the stored interval may be selected in the order of being close to the stored interval.

Such a way of selecting the PCH prevents the selection of a PCH having an intermittent reception interval shorter than that of stored in the memory and ensures the selection of a PCH that provides the user with a desired power consumption.

As described above, with the mobile radio system according to the present invention, the base station sends information on the paging channels having different intermittent reception intervals to the mobile stations, and sends a paging signal to the mobile station over the paging channel PCH that is reported from the mobile station by way of the PCH reporting signal. The mobile station receives from the base station the PCHs having different intermittent reception intervals, selects one of the PCHs, and reports the selected PCH as a standby PCH to the base station. Therefore, a preferred paging channel PCH can be selected as a PCH from a plurality of paging channels having different intermittent reception intervals, providing the user with an appropriate usage environment in accordance with how often the mobile station is used.

When a mobile station sends a PCH reporting signal to the base station, the base station checks the total number of mobile stations that have been assigned the same paging channel as was reported by the mobile station, and determines whether an additional mobile station can be assigned the same PCH. The base station then informs the mobile station as to whether the reported PCH can be assigned to the mobile station, so that the mobile station enters a standby state in an appropriate PCH that can be accepted by the base station. This way of finding an appropriate PCH prevents particular PCHs from being accessed more frequently than the other PCHs.

The mobile station selects, as a standby PCH, a PCH having an intermittent reception interval close to and less than a desired interval. Therefore, PCHs having longer intermittent reception intervals are not selected, ensuring that the users are assigned a PCH having an intermittent reception interval as close to their desire as possible.

Alternatively, the mobile station selects, as a standby PCH, a PCH having an intermittent reception interval close to and more than a desired interval. Therefore, PCHs having shorter intermittent reception intervals are not selected, ensuring that the power consumption of the mobile station is as close to the user's desire as possible.

When the mobile station is powered on or moves from one radio zone to another, the mobile station reelects a standby PCH according to a desired intermittent reception interval and reports the selected PCH to the base station. This ensures that a standby PCH is automatically set as required.

The mobile station reelects a standby PCH having a desired intermittent reception interval by carrying out a predetermined operation, and reports a new standby PCH to the base station. This predetermined operation allows the user to set an intermittent reception interval in accordance with a new usage environment of the mobile station.

In response to the non-approval signal received from the base station, the mobile station selects, as a standby PCH, another PCH having an intermittent reception interval, which is the next closest to the desired interval. Subsequently, the mobile station reports the selected new PCH to the base station. Therefore, if the paging channel PCH reported to the base station is not approved, a standby PCH having an intermittent reception interval as close to the desired interval as possible may be automatically set.

What is claimed is:

1. A mobile radio system having a base station with a plurality of paging channels PCH and a mobile station, the base station transmitting a paging signal to the mobile station in response to a request from the mobile station, the paging signal being transmitted over the paging channel PCH assigned to the mobile station, the mobile station being in a standby state in the paging channel PCH to receive a paging signal, wherein the base station informs different intermittent reception intervals assigned to the paging channels PCHs to the mobile station, and transmits a paging signal to the mobile station over a paging channel PCH which has been reported by way of a PCH reporting signal from the mobile station; and the mobile station receives from the base station information on the PCHs having different intermittent reception intervals, selects one of the PCHs as a standby PCH, and reports the selected PCH to the base station by way of the PCH reporting signal.

2. The mobile radio system according to claim 1, wherein when the mobile station sends the PCH reporting signal to the base station, the base station determines whether an additional mobile station can be assigned to the paging channel PCH reported by the PCH reporting signal, by checking station checks the total number of mobile stations that have been assigned to the paging channel PCH reported by way of the PCH reporting signal, and sends an approval signal or a non-approval signal to the mobile station depending on whether the paging channel PCH reported by the PCH reporting signal is approved or not approved; and the mobile station enters a standby state in a paging channel PCH that can be accepted by the base station.

3. The mobile radio system according to claim 2, wherein the mobile station selects, as a standby channel PCH, a paging channel PCH having an intermittent reception interval the closest to and less than a desired interval, and reports the selected paging channel PCH to the base station.

4. The mobile radio system according to claim 2, wherein the mobile station selects, as a standby channel PCH, a paging channel PCH having an intermittent reception interval the closest to and more than a desired interval, and reports the selected paging channel PCH to the base station.

5. The mobile radio system according to claim 3, when the mobile station is powered on or moves from one radio zone to another, the mobile station reelects a standby channel PCH according to a desired intermittent reception interval and reports the selected PCH to the base station.

6. The mobile radio system according to claim 3, wherein the mobile station reelects a standby PCH having a desired intermittent reception interval by carrying out a predetermined operation, and reports a new standby PCH to the base station.

7. The mobile radio system according to claim 3, wherein in response to a non-approval signal received from the base station, the mobile station selects, as a standby PCH, another PCH having an intermittent reception interval which is the next closest to the desired interval, and then reports the selected new PCH to the base station.

8. The mobile radio system according to claim 4, when the mobile station is powered on or moves from one radio zone to another, the mobile station reelects a standby channel PCH according to a desired intermittent reception interval and reports the selected PCH to the base station.

9. The mobile radio system according to claim 4, wherein the mobile station reelects a standby PCH having a desired intermittent reception interval by carrying out a predetermined operation, and reports a new standby PCH to the base station.

10. The mobile radio system according to claim 4, wherein in response to a non-approval signal received from the base station, the mobile station selects, as a standby PCH, another PCH having an intermittent reception interval which is the next closest to the desired interval, and then reports the selected new PCH to the base station.

* * * * *